United States Patent [19]
Lemesle et al.

[11] 4,256,365
[45] Mar. 17, 1981

[54] OPTICAL FIBRE COUPLER

[76] Inventors: Marcel E. Lemesle, 3 Rue Emile le Gac, Perros Guirec, France, 22700; Marcel H. Guibert, 20 Cité Saint Roch; Claude A. Le Moing, 33 Avenue de Lorraine, both of Lannion, France, 22300

[21] Appl. No.: 49,226

[22] Filed: Jun. 18, 1979

[30] Foreign Application Priority Data

Jun. 29, 1978 [FR] France ................ 78 19438

[51] Int. Cl.³ .............................. G02B 5/16
[52] U.S. Cl. .................. 350/96.18; 350/96.15
[58] Field of Search .............. 350/96.15, 96.18

[56] References Cited
U.S. PATENT DOCUMENTS

| | | | |
|---|---|---|---|
| 4,011,005 | 3/1977 | Hawkes et al. | 350/96.15 |
| 4,083,625 | 4/1978 | Hudson | 350/96.15 |

FOREIGN PATENT DOCUMENTS 2703887  8/1977  Fed. Rep. of Germany ........ 350/96.18

OTHER PUBLICATIONS

B. S. Kawasaki et al "Bulb Ended Fibre Coupling to LED Sources" *Optical & Quantum Electronics* vol. 7, No. 4, Jul. 1975.
T. Ozeki et al "Efficient Power Coupling using Taper-Ended Multimode Optical Fibres" in *Electronics Letts.* vol. 12, No. 23, Nov. 1976.

*Primary Examiner*—Stewart J. Levy
*Attorney, Agent, or Firm*—Abraham A. Saffitz

[57] ABSTRACT

Optical fibre coupler comprising at least three branches of the optical fibre type. A three-branch coupler comprises first and second optical fibres having two end frustoconical portions which are fastened to one another. The two frustoconical portions are terminated by a first common spheroidal end centered on their common generatrix and having a diameter substantially greater than the sum of the core diameters of their small end bases. The third branch of the three-branch coupler is constituted by a third optical fibre whose end lies opposite the first spheroidal end. In the case of a four-branch coupler, the fourth branch is constituted by a fourth optical fibre. The ends of the third and fourth optical fibres are formed as two frustoconical portions which are fastened to one another and terminated by a second common spheroidal end analogous to the first spheroidal end. The first and second spheroidal ends lie opposite each other.

13 Claims, 8 Drawing Figures

OPTICAL FIBRE COUPLER

CROSS REFERENCES TO RELATED APPLICATIONS

Applicants hereby make cross references to their French Patent Application PV No. 78 19438, filed June 29, 1978 and claim priority thereunder following the povisions of 35 U.S.C. 119.

BACKGROUND OF THE INVENTION

1. Field of the Invention

The present invention concerns an optical fibre coupler which comprises at least three branches of the optical fibre type. Some of those optical fibres each have a frustoconical end portion fast with one another.

2. Description of the Prior Art

Directional four-branch optical couplers—of which first and third branches are built up from a first optical fibre, and of which second and fourth branches are built up from a second optical fibre—are for example disclosed in the following articles:

article by Takeshi OZEKI and B. S. KAWASAKI in Applied Physics Letters, Vol. 28, No. 9, 1st May 1976, pages 528 and 529, entitled "Optical directional coupler using tapered sections in multimode fibers";

article by B. S. KAWASAKI and K. O. HILL, in Applied Optics, Vol. 16, No. 7, July 1977, entitled "Low-loss access coupler for multimode optical fiber distribution networks"; and article by K. O. HILL, B. S. KAWASAKI and D. C. JOHNSON in Applied Physics Letters, Vol. 31, No. 11, 1st December 1977, entitled "Efficient power combiner for multiplexing multiple sources to single-fiber optical systems".

In disclosed optical couplers, each component branch of an optical fibre is shaped as a frustoconical tapered portion whose large base is prolonged by the straight portion of an end of the fibre and whose small base is amalgamated with that of the frustoconical portion forming the other component branch of the fibre. The two frustoconical portions of a fibre are identical and are obtained by hot softing and pulling under spring tension of the fibre to form a biconical portion. According to usage, the two biconical portions of the first and second optical fibres are joined together by fusion or are separated at their small bases and are embedded in a suitable clear optical adhesive.

For example, the propagation of a light signal from the first branch towards the third and fourth contiguous branches is effected directly in the first fibre and indirectly through at least the coating-to-coating interface of the biconical portions of the first and second fibres. For two given multimode fibres of the same structure which may have different nominal core diameters, the coupling coefficients and directional coefficients between branches are determined by the relative core diameters and by the conicity of the biconical portions ⸱f the two fibres. Expressed in other words, the cou- ling coefficients depend upon the hot pulling of the two fibres, whose characteristics can only be determined approximately insofar as obtaining predetermined coupling coefficients is concerned. Furthermore, for four-branch couplers obtained by predetermined pulling and fusion of the two optical fibres having specified optical and dimensional properties, the coupling coefficients are approximately the same, which does not allow by one and the same manufacturing process to make couplers with different coupling coefficients. Thus after pulling and fusion it is no longer possible to obtain other values of coupling ciefficient from the optical fibres which have been pulled and stuck together. The structure of such couplers does not permit the bidirectional coupling of, on the one hand, an optical fibre to, on the other hand, two other optical fibres without a considerable insertion loss.

OBJECTS OF THE INVENTION

The main object of this invention is to provide optical fibre couplers having three or four branches which are free of the above-mentioned drawbacks. A further object of this invention is to provide an optical fibre coupler for which, after fusion and drawing of the optical fibres constituting the coupler, it is possible to adjust the position of the branches of one side relative to the position of the branches of the other side so as to obtain predetermined coupling coefficients selected within a wide range of values, while the insertion loss is very low and is typically below 1 dB.

Another object of this invention is to provide an optical fibre coupler with optical fibre branches having different diameters, which again increases the choice range of the coupling characteristics of the coupler.

SUMMARY OF THE INVENTION

An optical coupler embodying the invention is formed by two branches constituted by first and second optical fibres which each have frustoconical portions at one end and by a third branch constituted by at least a third optical fibre. The two frustoconical portions are fast with one another and have their axes coplanar preferably. They are terminated by a first common spheroidal end which is centred on their common generatrix. The first spheroidal end has a diameter which is substantially greater than the sum of the core diameters of small ends of the frustoconical portions. One end of the third branch lies opposite the first spheroidal end.

In a four-branch optical coupler embodying the invention, the first and fourth branches are also formed by third and fourth optical fibres, which are hot drawn and fused in a manner similar to the first and second optical fibres. A second spheroidal end is common to the frustoconical end portions of the third and fourth optical fibres and lies opposite the first spheroidal end. According to the two embodiments, the micrometric displacement in the three-dimensional space of the first spheroidal end relative to the opposite end of the third optical fibre or relative to the second spheroidal end enables the values of coupling coefficients and directional coefficients to be adjusted.

Further, the insertion losses at the coupling region can be minimized by adjusting the relative positions of the adjacent ends of the optical fibres. A spheroidal end performs the function of focussing and optical distribution lens. The insertion losses also depend on the relative diameters of the small bases of the frustoconical portions. According to the first embodiment relating to a three-branch coupler, these losses are reduced when the core diameter of the end of the third optical fibre is substantially equal to the sum of the small base core diameters of the two frustoconical portions of the first and second optical fibres. According to the second embodiment relating to a four-branch coupler, the sum of the small base core diameters of the frustoconical portions of the first and second optical fibres and the sum of the small base core diameters of the third and fourth optical fibres are substantially equal preferably.

As known, the insertion losses also depend on the transition between the large base of the frustoconical portion and the straight portion of each fibre. Advantageously, this first dependent relationship is not true when the semi-angle at the apex of the frustoconical portion of each optical fibre equals the complement of the critical angle at the core-coating interface of the fibre.

According to usage, the first and second spheroidal ends may be held separate in resin, or may be fused together in a single spheroidal end, which connects the four branches together.

These optical couplers embodying the invention have numerous practical applications in an optical signal transmission system. The main such practical applications are as follows:
- coupling in duplex channels by optical fibres for the purpose of multiplexing optical data signals;
- obtaining multifrequency optical channels;
- continuous controls exercised on an optical transmission link;
- injecting a data or test signal into an optical link or taking such a signal from the optical link.

BRIEF DESCRIPTION OF THE DRAWING

Other objects and advantages of the optical coupler according to the invention will be clear from the following description of preferred embodiments and from the accompanying corresponding drawings, in which.

DESCRIPTION OF THE PREFERRED EMBODIMENTS

Figure 1:
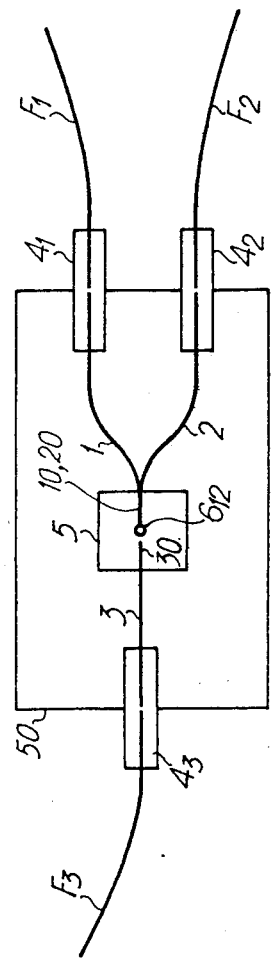
FIG. 1 schematically shows a three-branch optical coupler embodying the invention.

FIG. 1 illustrates a coupler for three optical fibres $F_1$, $F_2$ and $F_3$ of an optical signal transmission network. The light power $P_3$ guided in the fibre $F_3$ is distributed into two light powers $P_1$ and $P_2$ transmitted into the fibres $F_1$ and $F_2$ according to the insertion loss coefficient $\alpha$ and the coupling coefficient $C_{12}$ which characterize the coupler:

$$\alpha = 10 \log \frac{P_3}{P_1 + P_2} \, dB$$

-continued
$$C_{12} = 10 \log \frac{P_2}{P_2} \, dB$$

Each transmission fibre $F_1$, $F_2$, $F_3$ has a core diameter which, a priori, is different from that of the two others. The transmission fibres $F_1$, $F_2$, $F_3$ are connected to optical fibres 1, 2, 3 of the coupler by lodging in fibre-to-fibre optical connectors $4_1$, $4_2$, $4_3$ of the known kind, such as that described in U.S. Patent Application Ser. No. 915,660 filed June 5, 1978, now U.S. Pat. No. 4,160,580 issued July 10, 1979.

Figure 2:
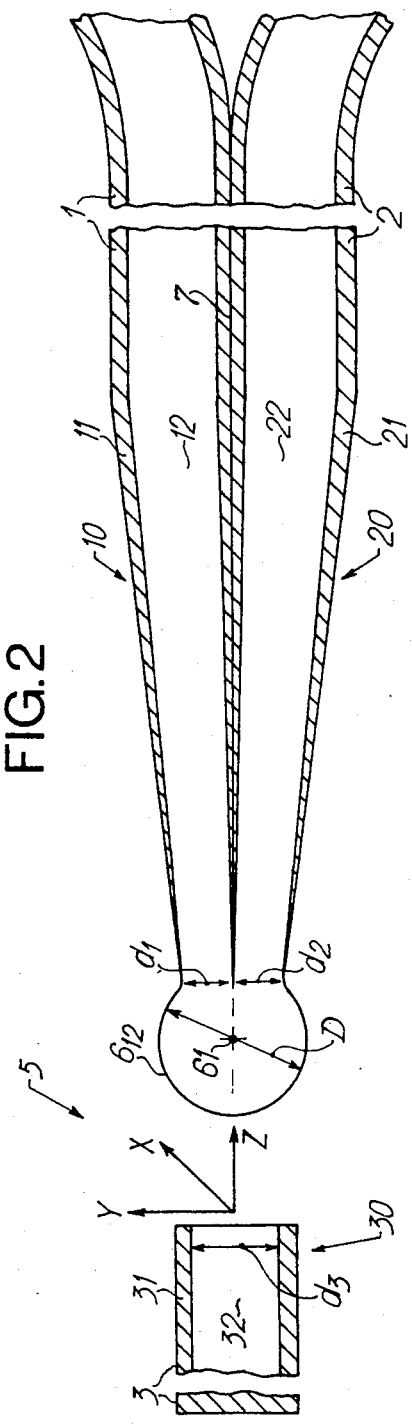
FIG. 2 details the coupling between the three fibres of the three-branch optical coupler of FIG. 1 through the first spherical end.

The coupling between the three fibres 1, 2, 3 of the coupler is effected in a common connection of the mutually-adjacent ends of the fibres 1, 2, 3 which is illustrated schematically in FIG. 1 by a block 5 and detailed in FIG. 2.

It is clear from FIG. 2 that the first and second fibres 1 and 2 each have an end frustoconical portion 10 or 20, which is prolonged in the form of a spheroidal common end $6_{12}$. These portions 10 and 20 may have different diameters, that is to say the fibres 1 and 2 or $F_1$ and $F_2$ may have different nominal core diameters. The coatings 11, 21 of the frustoconical portions 10, 20 of the fibres 1 and 2 are fast with one another on a common generatrix 7. The first spheroidal end $6_{12}$ is centred at point 61 of the generatrix 7 and has a diameter D which is greater than or substantially equal to the sum of the diameters of the cores $d_1$, $d_2$ of the small bases of the frustoconical portions 10 and 20. The spheroidal end $6_{12}$ is formed, insofar as its major portion is concerned, by a core which is constituted similarly to that of the fibres 1 and 2 and is surrounded by a very thin film of a substance similar to that of the coatings 11, 21 of the fibres 1 and 2. This film is, for all practical purposes, transparent for the transmission of optical signals.

The third optical fibre 3 constitutes the third branch of the coupler and has a coating structure 31 and a core structure 32 which are analogous to that of the first and second fibres 1 and 2. The diameter of the core $d_3$ of the fibre 3 is always smaller than or substantially equal to that D of the spheroidal end $6_{12}$. The axis of the straight end 30 of the fibre 3 inserted into the coupling block 5 is parallel to the common generatrix 7, but may be transversely offset with respect to this generatrix 7.

Finally, the coupler comprises a support 50 which supports the above-mentioned components. The support 50 may for example be in the form of a thin glass sheet to which are adhesively stuck the optical connectors $4_1$ to $4_3$ and on which after positional adjustment are fixed the ends 10 to 30 of the fibres 1 to 3 and the spheroidal end $6_{12}$. This attachment of the ends 10 to 30 and of the spheroidal $6_{12}$ is effected by means of a rapid polymerization-type resin spread on the surface represented by the block 5 of FIG. 1.

Figure 3:
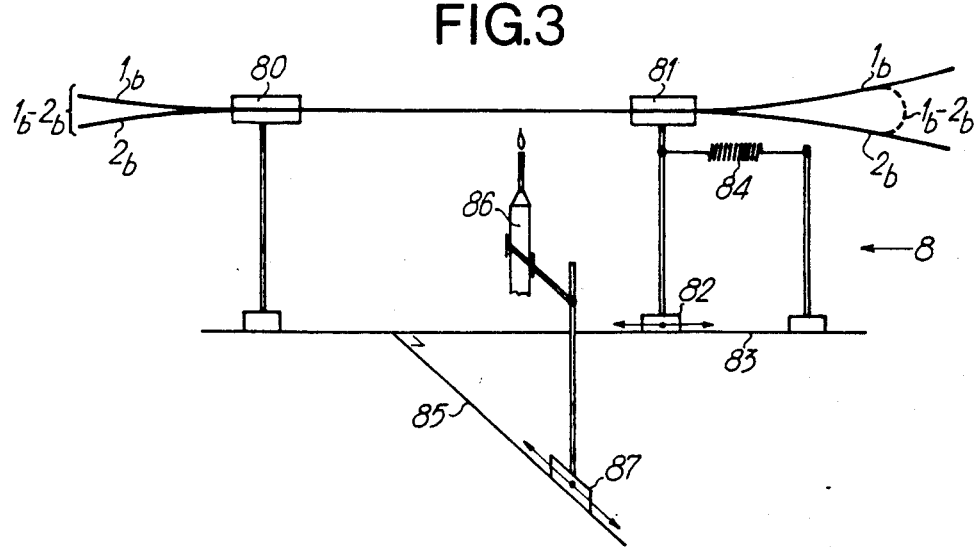
FIG. 3 is a schematic block-diagram showing the apparatus for manufacturing frustoconical portions and the spheroidal ends of a pair of optical fibres.

The apparatus 8 used for manufacturing the spheroidal end $6_{12}$ which is common to the two branches or optical fibres 1 and 2 of the three-branch coupler, is illustrated in FIG. 3. As will be seen below, this apparatus is also used for obtaining the second spheroidal end common to the two other branches, or to the third and fourth optical fibres, of the four-branch coupler embodying the invention.

The two optical fibres 1 and 2 can issue, preferably when they have identical diameters, from one and the same starting optical fibre $1_b$-$2_b$, which is folded onto itself, as illustrated in discontinuous line in FIG. 3, or from two starting optical fibres $1_b$ and $2_b$ whose diameter are generally different but whose structure is the same. After clamping in a stationary vise 80, these two starting fibres $1_b$ and $2_b$ are twisted or wound around one another so as to obtain excellent mutual contact. Then these twisted starting fibres are horizontally drawn and clamped in a second movable vise 81. The vise 81 is mounted on a slide 82 which slides horizontally along a rail 83 and is resilienty urged by a traction spring 84 in the direction away from the fixed vise 80. The travel path of the slide 82 is controlled by means of a horizontal micrometric displacement table which supports the rail 83 and also a second rail 85 which extends perpendicularly to the rail 83.

Figure 4:
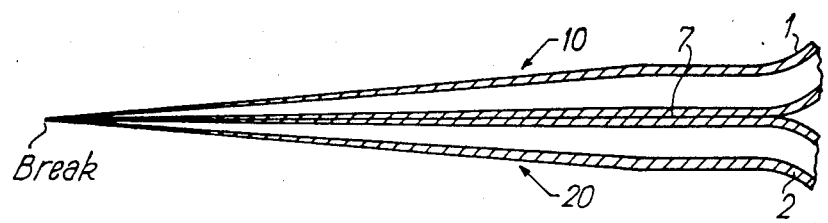
FIG. 4 shows conical end portions of an optical fibre of FIG. 3, after drawing and breaking.

During a second stage, a microblowpipe 86 is mounted on a second slide 87 which slides along rail 85. The flame of the microblowpipe 86 is brought to a position below the two starting fibres $1_b$ and $2_b$ which are drawn between the two vises 80 and 81. The hot drawing of the starting fibres $1_b$ and $2_b$ is produced by the combined action of the heating effect of the microblowpipe 86 and of the pulling force of the spring 84. In step with the hot drawing, the cross sections of the starting fibres $1_b$ and $2_b$ become narrowed until they break, so that the parts of the two starting fibres which have been twisted together and are clamped between a stationary vise 80 and a movable vise 81 separate from each other. As shown in FIG. 4, each of the parts which have thus been separated from each other is constituted by two fibres 1 and 2 which are fast with one another and each of which has a conical tapered portion which relative to the other has a common coating generatrix 7 and a coplanar axis.

Then in the course of third stage, the spheroidal end $6_{12}$ is obtained by fusing together the common end to the two conical end portions of the fibres 1 and 2 by means of the microblowpipe 86. The assembly of the two fibres 1 and 2 has a structure such as has been described above with reference to FIG. 2.

In the course of a fourth stage, the position of the third fibre 3 is adjusted relative to the assembly constituted by the first and second optical fibres 1 and 2 as a function of the predetermined characteristics of the three-branch optical coupler to be obtained.

Figure 5:
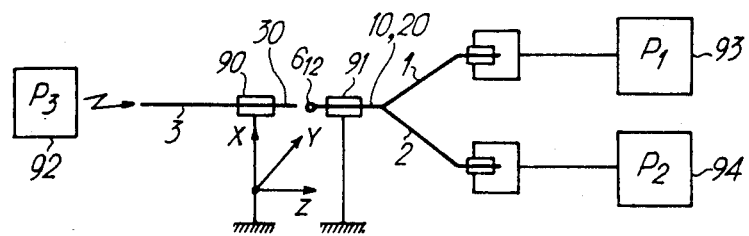
FIG. 5 is schematic block-diagram showing the micrometric displacement means and measuring means used for obtaining predetermined coupling coefficients.

For this purpose and as illustrated in FIG. 5, the end 30 of the fibre 3 and the assembly of the frustoconical portions 10, 20 of the fibres 1, 2 fast with one another are clamped in a movable vise 90 and in a stationary vise 91, so that the end 30 lies opposite the end $6_{12}$, as detailed in FIG. 2. These vises 90 and 91 are mounted on a micrometric displacement table in the three-dimensional space in accordance with the cartesian reference system for coordinates X, Y, Z in which Z designates the direction parallel to the axis of the third fibre 3 and parallel to the common generatrix 7. The other end of the fibre 3 receives a light signal of power $P_3$ from a light source and through suitable focussing elements, which are designated as a whole by a block 92. The light powers $P_1$ and $P_2$ are received through the coupling effected by the fibres 1 and 2 and are measured at the ends of their straight portions by means of photowattmeters 93 and 94. It is possible—as a function of the positional control exercized in the three-dimensional space of the end 30 of the third optical fibre 3 relative to the central point 61 of the spheroidal end $6_{12}$, and also as a function of the light power measurement $P_1$ and $P_2$—to attain the coupling coefficient $C_{12}$ while at the same time the insertion loss coefficient $\alpha$ is optimized.

Finally according to usage, either the preceding assembly is maintained for obtaining another value of the coefficient $C_{12}$ or, as already stated, the end 30 of the third optical fibre 3 and the frustoconical portions 10, 20 of the first and second optical fibres 2, 3 are embedded in a suitable resin on a thin glass sheet 50, as shown in FIG. 1.

When controlling the position of the end 30 of the fibre 3 relative to the spheroidal end $6_{12}$, the displacements in the transverse directions X and Y have enabled the distribution of the light power $P_3$ in the two fibres 1 and 2 to be calibrated for obtaining the coupling coefficients $C_{12}$ having a value between 3 dB and 30 dB, while at the same time insertion losses $\alpha$ lower than 1 decibel are maintained. The control of the insertion losses $\alpha$ is essentially realized by the axial movement of the fibre 3 in the direction Z and by means of the spheroidal end $6_{12}$ which plays the part of focussing lens.

In addition to the positional adjustment carried out in the directions X, Y, Z, the dimensions of the frustoconical portion 10 or 20 of each first and second optical fibre 1 or 2 relative to the straight portion of the fibre also affects the insertion loss coefficient $\alpha$. Expressed in other words, it is appropriate to accommodate the numerical aperture of the frustoconical portion to the numerical aperture of the fibre, so as to optimize the insertion losses.

Figure 6:
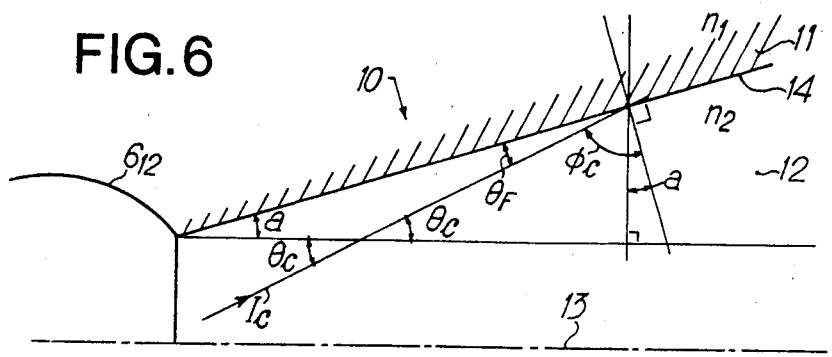
FIG. 6 is a diagram showing the propagation path of a light ray undergoing total reflection in a frustoconical portion.

FIG. 6 shows a partial longitudinal half-section of a frustoconical portion such as that 10 of the optical fibre 1 which has a semi-angle a at the apex. Also shown in this figure is an incident ray $I_c$ transmitted by the fibre 3 through the spheroidal end $6_{12}$, which ray penetrates into the portion 10 with an angle $\theta_c$. This angle $\theta_c$ is defined with respect to the axis 13 of the portion 10 and corresponds to the total reflection at the interface 14 between the coating 11 and the core 12. The incident angle of the ray $I_c$ at the interface 14 equals the critical angle $\phi_c$ of the fibre 1 which is defined by the known expression $$\sin \phi_c = n_1/n_2$$

in which $n_1$ and $n_2$ are the refractive indices of the coating 11 and of the core 12. If $\theta_F$ designates the penetration angle of such a ray $I_c$ undergoing total reflection in a straight portion of the fibre 1—this angle being the complement of the critical angle $\phi_c$—it will be seen, from FIG. 6, that the following expression is valid:

$$\theta_c = \theta_F + a$$

The numerical aperture of the frustoconical portion 10 equals $n_2 \sin \theta_c$ and increases the numerical aperture of the fibre 1 which for a straight portion equals $n_2 \sin \theta_F$. Hence, it is appropriate to accommodate the numerical aperture $n_2 \sin \theta_c$ to that of the fibre, so that there will be no insertion losses at the transition of the frustoconical portion and of the following straight portion of the fibre.

Figure 7:
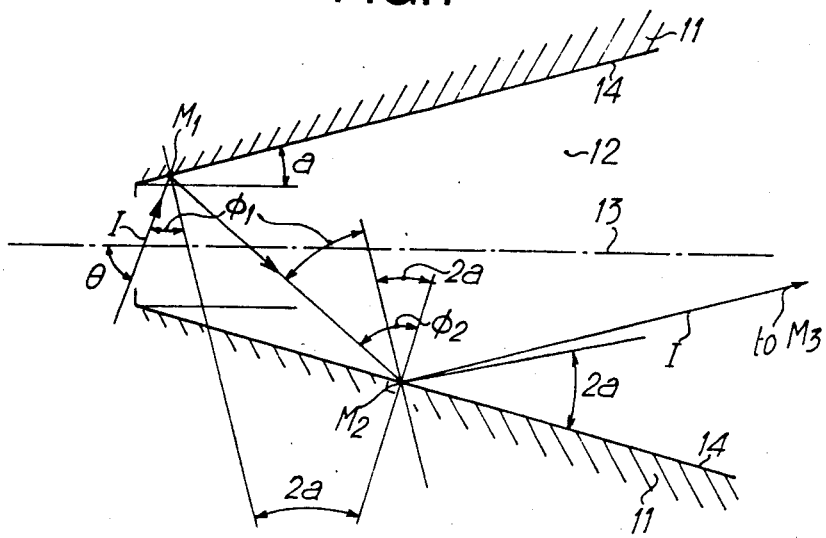
FIG. 7 is a diagram showing the multiple reflections of a light ray in a frustoconical portion.

As shown in FIG. 7, I designates a ray which has a penetration angle lower than $\theta_c$ and which penetrates under total reflection into the frustoconical portion 10 with an angle $\phi > \phi_c$. The ray I undergoes multiple internal reflections at the points $M_1$, $M_2$, $M_3$ . . . $M_n$, alternately on symmetrical generatrices of the interface 14 with angles $\phi_1$ to $\phi_2$, such as:

$$\phi_1 = \phi$$

-continued $$\phi_2 = \phi_1 + 2a = \phi + 2a$$
$$\phi_3 = \phi_2 + 2a = \phi + 4a$$
$$\ldots\ldots\ldots$$
$$\phi_n = \phi + 2(n-1)a$$

The number n of successive reflections in the frustoconical portion 10 is limited, because the ray I approximates to a direction parallel to a generatrix of the truncated cone. The last reflection at point $M_n$ takes place when $\phi_n > \pi/2 - 2a$. When such rays I have reached their equilibrium state, they consequently penetrate into the straight portion of fibre 1 at an angle equal to or substantially lower than a. It follows from this that a frustoconical portion of optical fibre embodying the invention which has a semi-angle at the apex such as $a = \theta_F = \pi/2 - \phi_c$, optimizes the insertion losses between the frustoconical portion and the straight portion of the fibre, and that the use of two such portions for optical fibres 1 and 2 reduces the insertion loss coefficient $\alpha$.

Figure 8:
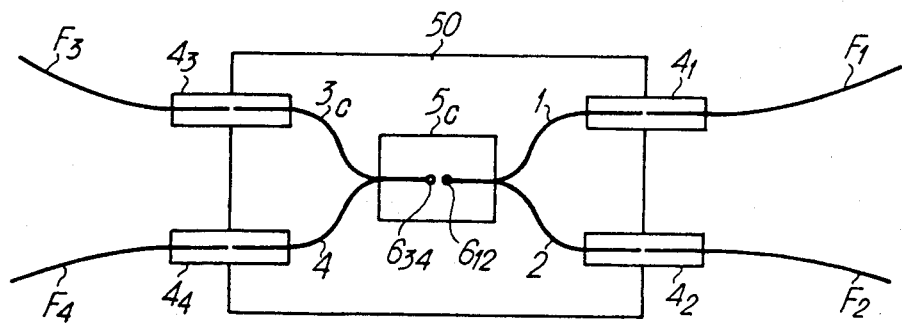
FIG. 8 schematically shows a four-branch optical coupler embodying the invention.

In accordance with a second embodiment of the invention shown in FIG. 8, the optical coupler comprises four branches which are formed by four optical fibres 1, 2, $3_c$ and 4 and enables two optical fibres $F_1$ and $F_2$ to be coupled to two other optical fibres $F_3$ and $F_4$ through four connectors $4_1$ to $4_4$. The four-branch coupler is constituted by a first pair of optical fibres 1-2 and by a second pair of fibres $3_c$-4. Each optical fibre pair has been formed from fusion of the ends of two fibres to form a first or second spheroidal end $6_{12}$, $6_{34}$, after drawing has taken place and after fusion of two starting optical fibres, in a manufacturing procedure similar to that described above with reference to FIGS. 2, 3 and 4. Everything which has been stated above—insofar as concerns the control of the position of the end 30 of the optical fibre 3 relative to the spheroidal end $6_{12}$ in the three-dimensional space and insofar as concerns the optimization of the insertion losses $\alpha$ such as control exercized in direction Z, and realization of the condition $a = \theta_F$—is also applicable to control of the position of the second spheroidal end $6_{34}$ of the optical fibres 3 and 4 relative to the first spheroidal end $6_{12}$ of the optical fibres 1 and 2, or vice versa, and to the optimization of the insertion losses in the fibres 1 to 4 between the frustoconical portion and the straight portion of each fibre.

According to the second embodiment, the micrometric displacement of the first spheroidal end $6_{12}$ relative to the second spheroidal end $6_{34}$ in the three-dimensional space will enable the coupling coefficient and directional coefficients $C_{31}$, $C_{32n}$ $C_{41}$ and $C_{42}$ to be adjusted in the two light propagation directions.

FIG. 8 also illustrates by a bloc $5_c$ the extent of the resin in which the spheroidal ends $6_{12}$, $6_{34}$ and the four frustoconical portions which are coupled by pairs of the fibres 1 to 4, are embedded.

That we claim is:

1. An optical fibre coupler comprising:
   two branches constituted by first and second optical fibres, each having a frustoconical portion at one end;
   said two frustoconical portions being fastened to one another and each terminated by a common spheroidal end centred on the common generatrix of said frustoconical portions; and
   a third branch constituted by at least a third optical fibre having one end laid opposite said common spheroidal end.

2. An optical fibre coupler according to claim 1 in which the diameter of said spheroidal end is substantially greater than the sum of the core diameters of small ends of said frustoconical portions.

3. An optical fibre coupler according to claim 1 in which the core diameter of said end of said third optical fibre substantially equals the sum of the small end core diameters of said two frustoconical portions of said first and second optical fibres.

4. An optical fibre coupler according to claim 1 in which the semi-angle at the apex of said frustoconical portion of each of said first and second optical fibres equals the complement of the critical angle of said optical fibre.

5. An optical fibre coupler according to claim 1 in which said first and second optical fibres are obtained from hot drawing of first and second starting optical fibres until these fibres break so as to form conical tapered end portions of said first and second optical fibres which are fast with each other along said common generatrix and from fusion of the common ends of said conical tapered end portions at the said first spheroidal end and, simultaneously, formation of said frustoconical portions of said first and second fibres.

6. An optical fibre coupler according to claim 1 including three-dimensional micrometric displacing means for (in which) the adjustment of insertion loss coefficients of the optical fibres of said coupler and the adjustment of the coupling coefficients between the branches of said optical fibres is carried out by said three-dimensional micrometric means (for displacing) which displaces said first common spheroidal end relative to said end of (at least) said third optical fibre.

7. An optical fibre coupler according to claim 1 comprising at least three fibre-to-fibre connectors each connected to one end of said first, second and third optical fibres by lodging, and a thin sheet on which are fixed the adjacent ends of said optical fibres by embedding them in a resin and said connectors containing the other ends of said optical fibres.

8. An optical fibre coupler comprising:
   four branches constituted by first, second, third and fourth optical fibres each having a frustoconical portion at one end;
   said two frustoconical portions of said first and second optical fibres being fast with one another and terminated by a first common spheroidal end centred on the common generatrix of said frustoconical portions of said first and second optical fibres;
   said two frustoconical portions of said third and fourth optical fibres being fast with one another and terminated by a second common spheroidal end centred on the common generatrix of said frustoconical portions of said third and fourth optical fibres; and
   said first and second spheroidal ends laid opposite each other.

9. An optical fibre coupler according to claim 8 in which the diameter of said first or second spheroidal ends is substantially greater than the sum of the small end core diameters of said frustoconical portions of said first and second optical fibres or said third and fourth optical fibres respectively.

10. An optical fibre coupler according to claim 8 in which the sum of the small end core diameters of said first and second optical fibre frustoconical portions and the sum of the small end core diameters of said third and fourth optical fibre frustoconical portions are substantially equal.

11. An optical fibre coupler according to claim 8 in which said first and second spheroidal ends form a common spheroidal end at the small ends of said four frustoconical portions of said first, second, third and fourth optical fibres.

12. An optical fibre coupler according to claim 8 in which the semi-angle at the apex of said frustoconical portion of each of said optical fibres equals the complement of the critical angle of said optical fibre.

13. An optical fibre coupler according to claim 8 including three-dimensional displacing means by means of which (in) the adjustment of the insertion loss coefficients of said optical fibres and the adjustment of the coupling (loss) coefficients between said optical fibres is carried out by said three-dimensional micrometric means (for displacing) which displaces said first spheroidal end relative to said second spheroidal end.

* * * * *